United States Patent

[11] 3,622,880

[72] Inventor Pierre C. Escaron
 Houston, Tex.
[21] Appl. No. 840,270
[22] Filed July 9, 1969
[45] Patented Nov. 23, 1971
[73] Assignee Schlumberger Technology Corporation
 New York, N.Y.
[32] Priority Dec. 23, 1968
[33] France
[31] 179,899

[54] SHOCK RESISTANT REMOTELY CONTROLLED GALVANOMETER MOUNT
 3 Claims, 6 Drawing Figs.
[52] U.S. Cl. .................................................. 324/97
[51] Int. Cl. .................................................. G01r 13/38
[50] Field of Search........................................... 324/97;
 74/425

[56] References Cited
 UNITED STATES PATENTS
 2,698,417 12/1954 Hathaway..................... 324/97
 3,339,426 9/1967 Borggrafe..................... 74/425
 2,882,498 4/1959 Turre ........................ 324/97 X Primary Examiner—Alfred Smith
Attorneys—Ernest R. Archambeau, Jr, David L. Moseley, Edward M. Roney and William R. Sherman ABSTRACT: New and improved means for mounting galvanometers in well logging recorders or the like are disclosed which include means, including a support bracket fixed relative to the recorder, a positioning member having a socket for receiving a galvanometer, gear means for rotating the positioning member relative to the bracket to adjust the zero position of the galvanometer, and means for eliminating backlash in the gear means. The entire galvanometer mounting bracket is rotatably mounted in a rocker assembly on the main recorder frame thus allowing rotatable adjustment of the galvanometer about a vertical and a transverse axis of the recorder main frame.

Pierre C. Escaron
INVENTOR

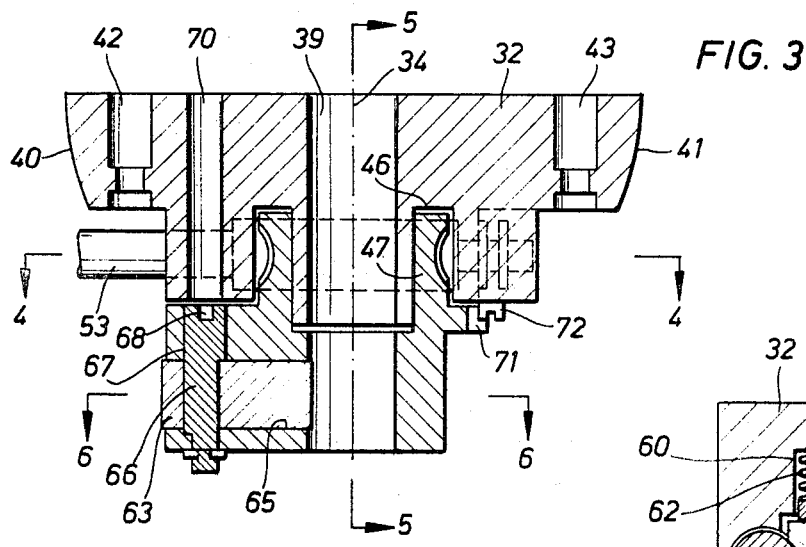
FIG. 3
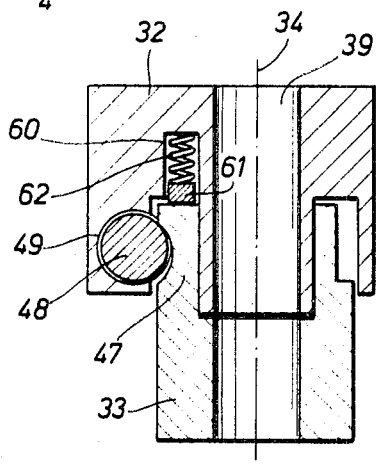
FIG. 5
FIG. 4
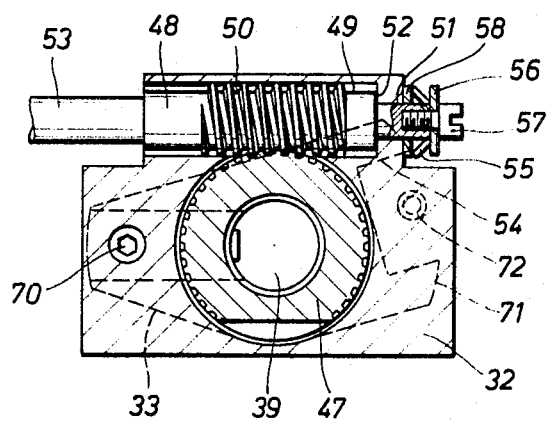
FIG. 6
Pierre C. Escaron
INVENTOR

SHOCK RESISTANT REMOTELY CONTROLLED GALVANOMETER MOUNT

BACKGROUND OF THE INVENTION

This invention relates to galvanometers as used in recorders, and more particularly, to a system for rotatably supporting a mirror type galvanometer in a recorder permitting remote adjustment of the angular position of the galvanometer.

When several mirror type galvanometers are to be mounted side by side in a photographic recorder, it is a common practice to use a magnetic mounting structure for all galvanometers. Each galvanometer deflects a narrow beam of light onto a suitable recording medium such as a photographic film for making thereon a record of the electrical current flowing through this galvanometer coil. In order to position the image projected onto the recording medium, the galvanometer must be adjustable in two directions relative to the mounting block.

The first adjustment usually referred to as vertical adjustment, changes the vertical height of the image on the recording medium. This adjustment is usually obtained by tilting the galvanometer around a horizontal axis parallel to the recording medium. For this purpose the galvanometer is mounted on a rocker member which rests on a cylindrical surface of the mounting block. Such a rocker member is disclosed in U.S. Pat. No. 3,204,182 granted to M. F. B. Picard et al. on Aug. 31, 1965.

The second adjustment which will be referred to as horizontal adjustment is obtained by turning the galvanometer about its longitudinal axis. A passageway is made through the rocker member for receiving the galvanometer, this passageway includes a sleeve member which allows for a rotation of the galvanometer about its longitudinal axis. The galvanometer is rotated by means of a knob which engages the top portion of the galvanometer.

Although the rocker member has proved to be a very efficient system for the vertical adjustment of the galvanometer, it is very difficult to manufacture a sleeve member which meets the more important requirements of accuracy needed by the modern industry. This sleeve member which has to grip the galvanometer in a fairly tight manner does not permit a sufficiently smooth and accurate rotational adjustment of the galvanometer even when special materials having a low coefficient of friction such as polytetrafluoroethylene are used.

An object of the invention is to provide a new and improved galvanometer support permitting a smooth and accurate adjustment of this galvanometer.

Another object of the invention is to provide an adjustable support for galvanometer practically insensitive to shocks and vibrations.

SUMMARY OF THE INVENTION

Briefly, according to the invention mounting apparatus for holding a galvanometer unit comprises a magnetic frame structure including a pole piece structure having a recessed cylindrical top portion. A rocker member comprises a base member which rests on this recessed top portion and a rotatable member mounted for rotational movement relative to said base member. The rotatable member is provided with a bore for receiving the galvanometer unit and means for locking the galvanometer unit in said bore. A worm-gear mechanism interconnects the base member and the rotatable member and spring means eliminate free movement in the worm-gear mechanism thereby permitting an accurate adjustment of the angular position of the galvanometer unit.

For a better understanding of the invention, reference is had to the following description taken in connection with the accompanying drawings, the scope of the invention being pointed out in the appended claims.

Referring to the drawings:

FIG. 3 is an enlarged cross-sectional view of the rocker member of FIG. 2;

FIG. 4 is a plan sectional view taken along line 4—4 of FIG. 3;

FIG. 5 is a sectional view taken along line 5—5 of FIG. 3; and

FIG. 6 is a plan sectional view taken along line 6—6 of FIG. 3.

DESCRIPTION OF THE PREFERRED EMBODIMENT

Figure 1:
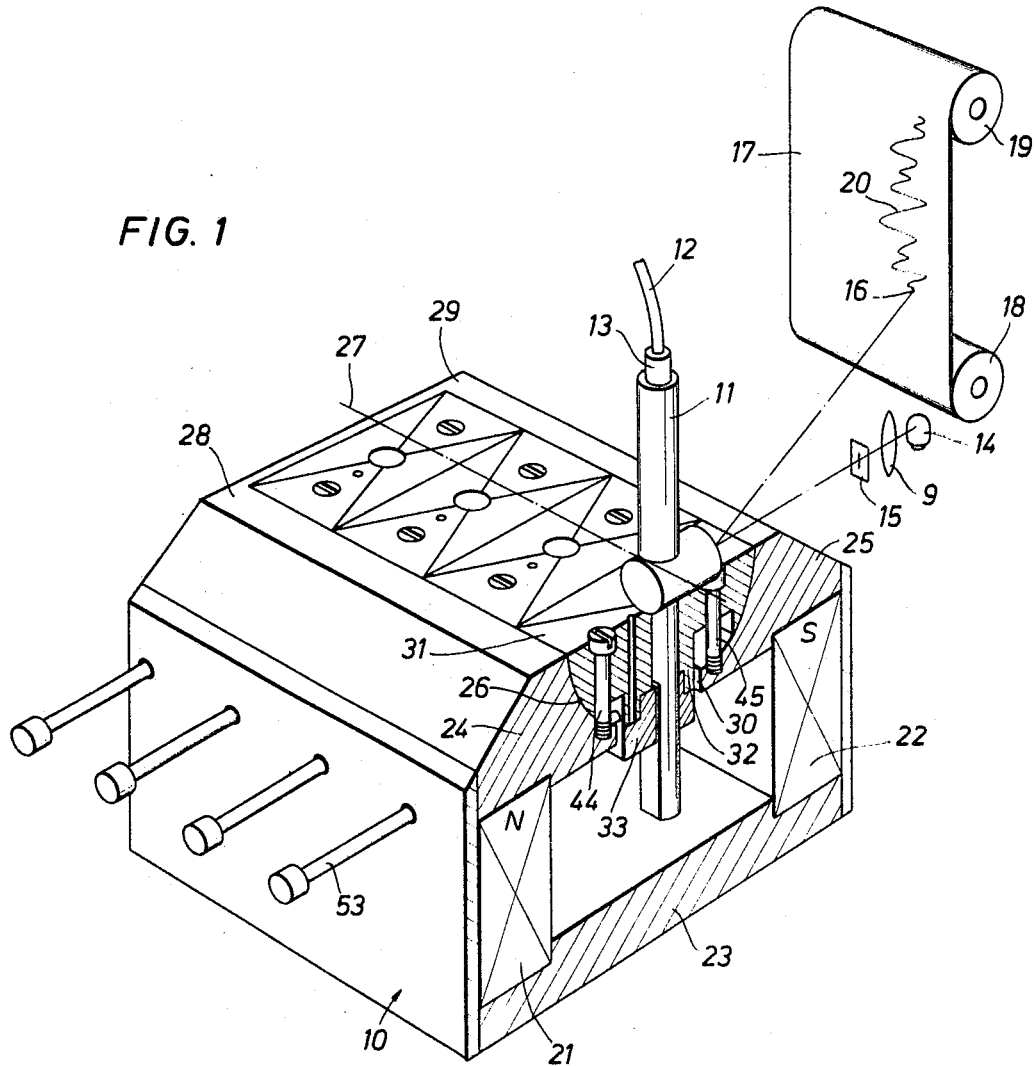
FIG. 1 is a partly sectional isometric view of an embodiment of a galvanometer mounting apparatus constructed in accordance with the present invention.

Referring now to FIG. 1, there is shown a galvanometer mounting apparatus 10 constructed to hold four galvanometer units. For simplicity, only a single galvanometer unit 11 is shown, the portion of the mounting apparatus 10 which holds this galvanometer unit 11, being shown in a cross-sectional manner. The mounting apparatus 10 may be either extended or reduced to provide for the mounting of a greater or lesser number of galvanometer units.

The galvanometer 11 is of a known type wherein a movable mirror and coil assembly is suspended within the barrel thereof. The coil may be energized with electrical current through a terminal lead 12 connected to the top part of the galvanometer unit by means of a plug 13. Light coming from a light source 14 is passed through a condenser lens 9 and a suitable object pattern 15 and projected onto the mirror of the galvanometer unit. This mirror reflects an image 16 on a recording medium 17 which moves from a pickup spool 18 to a receiving spool 19. A curve 20 is thus recorded on the recording medium 17.

The mounting apparatus 10 includes a magnetic frame surface having a pair of permanent magnets 21 and 22 which extend along the length of the apparatus 10. The magnetic frame structure further includes a yoke member 23 made of a metal of high magnetic permeability. The yoke member 23 and the two magnets 21 and 22 form a generally U-shaped structure with the upper faces of the permanent magnets constituting a pair of pole faces of opposite polarity. The magnetic frame structure is completed by two pole pieces 24 and 25 of high magnetic permeability material extending along the length of the apparatus and secured to the upper faces of the magnets 21 and 22. The pole piece structure formed by the two pole pieces 24 and 25 is provided with a curved surface 26 which runs the entire length of the apparatus. The curved surface 26 faces outwardly from the frame structure, the axis 27 of this curved surface being located a slight distance outside the upper surfaces 28 and 29 of the pole pieces 24 and 25 in order to pass through the center of the galvanometer mirror when this galvanometer is mounted in the apparatus. A relatively wide longitudinal gap 30 is located between the pole pieces 24 and 25, for receiving the galvanometer units and rocker members described hereinafter.

The magnetic circuit of the magnetic frame structure is completed by a plurality of rocker members resting on the curved surface 26, each rocker member being designed to hold a galvanometer unit. Only the rocker member 31, which holds the galvanometer unit 11, will be considered in detail, the other rocker members being of identical construction. This rocker member 31 is best shown on FIGS. 2—6. As shown on FIGS. 3 and 5, this rocker member 31 comprises a base member 32 and a rotatable member 33 which can rotate relative to the base member 32 about a substantially central axis 34.

Figure 2:
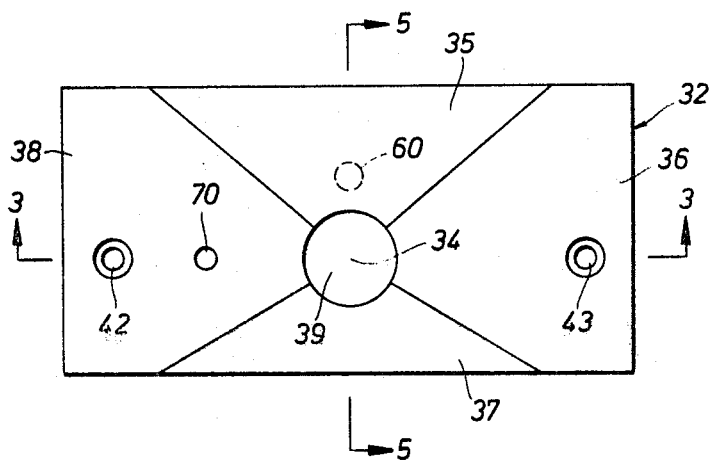
FIG. 2 is a plan view of a rocker member used in the apparatus of FIG. 1.

Referring to FIG. 2, the base member 32 is composed of four parts 35 to 38 which are welded together to form a single structural unit. Parts 36 and 38 are of magnetic material such as iron having a high magnetic permeability. Parts 35 and 37 are made of nonmagnetic material such as brass having a magnetic permeability substantially equal to one. The base member 32 also has a cylindrical bore 39 which extends vertically through the central portion thereof. The magnetic portions 36 and 38 are tapered down to a dimension which is less than the diameter of the bore 39 so that the bore 39 forms a gap in the magnetic circuit. As a consequence, the magnetic flux is concentrated across the bore 39 at the location that will be occupied by the movable coil contained within the galvanometer unit 11.

As shown on FIG. 3, the base member 32 has two curved faces 40 and 41 matched with the curved surface of pole pieces 24 and 25. Two bores 42 and 43 are designed to receive retaining screws 44 and 45 for mounting the base member 32 on the magnetic pole structure in a conventional manner as shown on FIG. 1. These retaining screws 44 and 45 are used to tilt the rocker member about axis 27 thereby adjusting the position of the galvanometer in one direction (vertical adjustment) as described in the above-mentioned patent.

An annular recess 46 having the same axis 34 as the bore 39 is provided in the lower portion of base member 32. The annular recess 46 faces downwardly and is designed to receive an upper portion 47 of the rotatable member 33. The inner surface of the annular recess 46 forms a shaft on which the upper portion 47 of rotatable member 33 is journaled for rotating about the axis 34 as well as for sliding along this axis. The upper portion 47 is a gear, the peripheral surface of which has a concave cross section. A worm screw 48 is mounted for rotation in a bore 49 located in the base member 32 substantially perpendicular to the bore 39 (FIG. 4). The bore 49 has a center part 50 of relatively large diameter adjacent to the annular recess 46 and an end part 51 of smaller diameter, the end part 51 and center part 50 being separated by a shoulder 52. The worm screw 48 engages the peripheral surface of the gear 47. One end of the worm screw 48 is attached to a relatively long flexible cable 53, permitting a remote control of screw 48. The other end 54 of the worm screw 48 is of smaller diameter and rotatably mounted in the end part 51 of bore 49. The worm screw 48 is maintained in contact with shoulder 52 by means of a flexible spring washer 55. The flexible washer 55 is compressed between the outer side of the base member 32 and a rigid washer 56 attached to the end part 54 of worm screw 48 by a screw 57. A ring 58 made of plastic material such as Teflon can be interposed between the flexible washer 55 and the base member 32 to minimize friction. This arrangement prevents any free movement of screw 48 in a lengthwise direction.

A cylindrical bore 60 (FIG. 5) opening toward the rotatable member 33 is provided in base member 32 near bore 39. This bore 60 contains a coiled spring 62 and a slidable member 61 made of plastic material, such as Teflon, which abuts the upper surface of the rotating member 33. The spring 62 applies to the slidable member 61 a downwardly directed force which pushes the rotatable member 33 away from the base member 32. The upper part of the concave peripheral surface of gear 47 therefore comes into intimate sliding contact with the threads on the worm screw 48 reducing the clearance between worm screw 48 and gear 47 to zero.

As shown on FIGS. 3 and 6, the lower part of rotatable member 33 includes a locking mechanism for fixedly mounting the galvanometer unit 11. This locking mechanism includes a locking key 63 slidably mounted in a first bore 65 perpendicular to bore 39. The locking key 63 has a hole 64 of oval configuration extending vertically therethrough. The locking mechanism further includes a control shaft 66 rotatably mounted in a second bore parallel to bore 39 and passing through hole 64 of locking key 63. The control shaft 66 may be rotated by a conventional hexagonal key inserted into a hexagonal cavity 68 located at the top of the control shaft. A bore 70 located in the base member 32 allows introduction of this hexagonal key. The middle portion of control shaft 66, which passes through the hole 64 of locking key 63 is a cylinder of smaller diameter than the top part of the control shaft, this middle part being eccentric with respect to the top part. Rotating this control shaft causes a sliding movement of locking key 63 into bore 39.

Rotating member 33 also includes a movement limiting fork 71 which cooperates with a screw 72 mounted in base member 32 for limiting the angle of rotation of rotating member 33 with respect to base member 32.

For the operation of such a mounting apparatus, the rocker members are first mounted side by side on the magnetic frame structure, the flexible cable 53 of each rocker member passing through a front hole of the frame structure. Retaining screws 44 and 45 are mounted to maintain each rocker member on the frame structure. A galvanometer unit is then introduced in bore 39. Control shaft 66 is then rotated by means of a hexagonal key introduced through bore 70. Rotating of control shaft 66 pushes locking key 63 inwardly to contact a flat locking surface on the galvanometer barrel thereby locking the galvanometer barrel in bore 39. Vertical adjustment of the image 16 is made by tilting the rocker member on the cylindrical surface of the pole pieces. Horizontal adjustment is made by rotating the flexible cable 53. The rotating movement is transmitted by worm screw 48 to gear 47 and to the galvanometer 11 locked in rotatable member 33 by key 63. It will be appreciated that there is no slack between the rotation of flexible cable 53 and the rotation of galvanometer unit 11 due to the spring member 62 and to the flexible washer 55.

A rotation of one turn of the cable 53 produces a very small angular displacement of the galvanometer, this displacement corresponding to the pitch of the worm 48. It will be appreciated therefore that a very fine adjustment of the angular position of the galvanometer may be made.

While a particular embodiment of the present invention has been shown and described, it is apparent that changes and modifications may be made without departing from this invention in its broader aspects; and, therefore, the aim in the appended claims is to cover all such changes and modifications as fall within the true spirit and scope of this invention.

1. A galvanometer mount comprising: a frame including a pair of spaced pole pieces having horizontal concave surfaces facing one another and uniformly spaced about a selected horizontal axis; a base member having horizontal convex surfaces complementally engaged on said concave surfaces and cooperatively arranged for tilting about said horizontal axis in relation to said frame, said base member having a first vertical bore therein sized to receive a first portion of an upright galvanometer; a galvanometer holding member having a second vertical bore therein sized to receive a second portion of an upright galvanometer, said holding member being disposed adjacent to said base member with said first and second vertical bores in coincidental alignment with a selected vertical axis for rotation of said holding member thereabout in relation to said base member; first position-adjusting means cooperatively arranged between said frame and said base member and adapted for selectively tilting said base member about said horizontal axis to a selected position; and second position-adjusting means cooperatively arranged between said base member and said holding member and adapted for selectively rotating said holding member about said vertical axis in relation to said base member, said second position-adjusting means including a worm gear mounted in a generally-horizontal position on said base member and a ring gear mounted on said holding member and having teeth cooperatively engaged with the teeth of said worm gear for rotating said holding member upon rotation of said worm gear, and biasing means cooperatively arranged between at least one of said gears and said base member for urging said gear teeth into firm coengagement.

2. The galvanometer mount of claim 1 wherein said biasing means include first spring means between said ring gear and said base member for urging said ring gear vertically toward said worm gear.

3. The galvanometer mount of claim 2 wherein said biasing means further include second spring means between said worm gear and said base member for urging said worm gear horizontally toward said ring gear so that said first and second spring means provide a shock-resistant action resisting abrupt movement of said holding member in relation to said base member.

* * * * *